(12) United States Patent
Saita et al.

(10) Patent No.: US 8,293,181 B2
(45) Date of Patent: Oct. 23, 2012

(54) TUBULAR FLOW REACTOR AND METHOD FOR PRODUCING RESIN PARTICLE USING THE SAME

(75) Inventors: Yasuharu Saita, Tokyo (JP); Ryuji Kitani, Tokyo (JP); Masashi Mamino, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 127 days.

(21) Appl. No.: 12/816,557

(22) Filed: Jun. 16, 2010

(65) Prior Publication Data
US 2010/0331488 A1 Dec. 30, 2010

(30) Foreign Application Priority Data

Jun. 29, 2009 (JP) .................................. 2009-153563

(51) Int. Cl.
*B01J 19/18* (2006.01)
*B01F 7/16* (2006.01)
*B01F 7/18* (2006.01)
*C08F 2/01* (2006.01)

(52) U.S. Cl. ..................... 422/135; 422/225; 366/325.1; 366/325.92; 526/64; 526/88

(58) Field of Classification Search .................. 422/135, 422/224, 225; 366/241, 279, 325.1, 325.92, 366/325.93; 526/64, 88
See application file for complete search history.

(56) References Cited

U.S. PATENT DOCUMENTS

| 3,434,804 A * | 3/1969 | Winn ............................. 422/135 |
| 2009/0036603 A1 * | 2/2009 | Saita et al. ..................... 524/745 |
| 2011/0040049 A1 * | 2/2011 | Saita et al. ....................... 526/64 |

FOREIGN PATENT DOCUMENTS

| JP | 2003140386 | 5/2003 |
| JP | 2003316075 | 11/2003 |
| JP | 2005296894 A * | 10/2005 |
| WO | WO 2009113419 A1 * | 9/2009 |

OTHER PUBLICATIONS

Machine Translation for JP 2005-296894 A (Oct. 2005).*

* cited by examiner

*Primary Examiner* — Jennifer A Leung
(74) *Attorney, Agent, or Firm* — Lucas & Mercanti, LLP

(57) ABSTRACT

Provided is a tubular flow reactor containing: a cylindrical channel; a mixing shaft which is concentric with the cylindrical channel; and a mixing blade attached to the mixing shaft, wherein the tubular flow reactor satisfy the following requirements: t<2C and t/2C<A/C≦1, provided that C is a radius of the mixing shaft, t is a thickness of the mixing blade; A is a distance between a mixing blade plane B located at a forward position in a rotating direction of the mixing blade and a plane S passing through the center of the mixing shaft in a shaft direction, when plane B and plane S are parallel; and the mixing blade plane B is located at a more forward position in the rotating direction than the plane S.

11 Claims, 5 Drawing Sheets ated on Jun. 29, 2009 with Japan Patent
TUBULAR FLOW REACTOR AND METHOD FOR PRODUCING RESIN PARTICLE USING THE SAME

CROSS REFERENCE TO RELATED APPLICATIONS

This application is based on Japanese Patent Application Nos. 2009-153563 filed on Jun. 29, 2009 with Japan Patent Office, the entire content of which is hereby incorporated by reference.

TECHNICAL FIELD

The present invention relates to a tubular flow reactor, the method for producing resin particles using the same tubular flow reactor.

BACKGROUND

There are known the methods of producing resin particles using a batch type reactor or a continuous type reactor as a method of industrially producing resin particles using an emulsion polymerization method or a suspension polymerization method.

The batch reactor had problems of having much non-production time which is not related with the polymerization reaction; increased initial plant investment due to a large sized reactor, and insufficient heat transfer capacity:

Then, there has come to be adopted a continuous type reactor which enables to reduce the non-production time and can also downsizing equipment.

As a continuous type reactor, a tubular flow reactor was disclosed (for example, refer to Patent documents 1 and 2 indicated below).

When promotion of a reaction is intended using a continuous type reactor, it will be required to install a dynamic mixing mechanism such as a mixing blade.

Patent document 1: Japanese Patent Application Publication (JP-A) No. 2003-140386

Patent document 2: JP-A No. 2003-316075

SUMMARY

When a dynamic mixing mechanism such as a mixing blade was used in a tubular flow reactor, it was hard to maintain a plug flow property and there occurred a problem that the homogeneity of the obtained resin particles will be lost.

An object of the present invention is to provide an excellent tubular flow reactor which can produce uniform resin particles having a narrow particle size distribution and a narrow molecular weight distribution without containing coarse particles, by maintaining a plug flow property of a polymerizable reactive liquid even when the mixing blade is employed. Another object of the present invention is to provide a method of producing resin particles using the aforesaid tubular flow reactor.

The present invention can be achieved with the embodiments described below.

1. A tubular flow reactor comprising:
    a cylindrical channel;
    a mixing shaft which is concentric with the cylindrical channel; and
    a mixing blade attached to the mixing shaft,
    wherein the tubular flow reactor satisfy the following requirements:
    $t < 2C$
    $t/2C < A/C \leq 1$,
    provided that C is a radius of the mixing shaft, t is a thickness of the mixing blade; A is a distance between a mixing blade plane B located at a forward position in a rotating direction of the mixing blade and a plane S passing through the center of the mixing shaft in a shaft direction, when plane B and plane S are parallel; and the mixing blade plane B is located at a more forward position in the rotating direction than the plane S. Here, the mixing blade plane B is one of the two sides of the mixing blade which is located in an advanced position in the rotating direction of the mixing blade with respect to the other side.

2. The tubular flow reactor of the aforesaid item 1, satisfying the following requirement:
    $0.80 \leq Lb/La \leq 0.99$,
    provided that La is a length of the cylindrical channel and Lb is a length of the mixing blade.

3. The tubular flow reactor of the aforesaid items 1 or 2, satisfying the following requirement:
    $1 \leq La/D \leq 100$,
    provided that La is a length of the cylindrical channel and D is an inside diameter of the cylindrical channel.

4. A method for producing a polymer resin particle comprising the step of:
    polymerizing a polymerizable monomer using the tubular flow reactor of any one of the aforesaid items 1 to 3.

5. A method for producing a polymer resin particle comprising the step of
    polymerizing a polymerizable monomer with an emulsion polymerization method using the tubular flow reactor of any one of the aforesaid items 1 to 3.

The tubular flow reactor of the present invention and the method for producing the resin particles using the same tubular flow reactor have achieved to give an excellent effect of producing the uniform resin particles having a narrow particle size distribution and a narrow molecular weight distribution without containing coarse particles, by maintaining a plug flow property of a polymerizable reactive liquid even when the mixing blade is employed.

DESCRIPTION OF THE PREFERRED EMBODIMENTS

Figure 1:
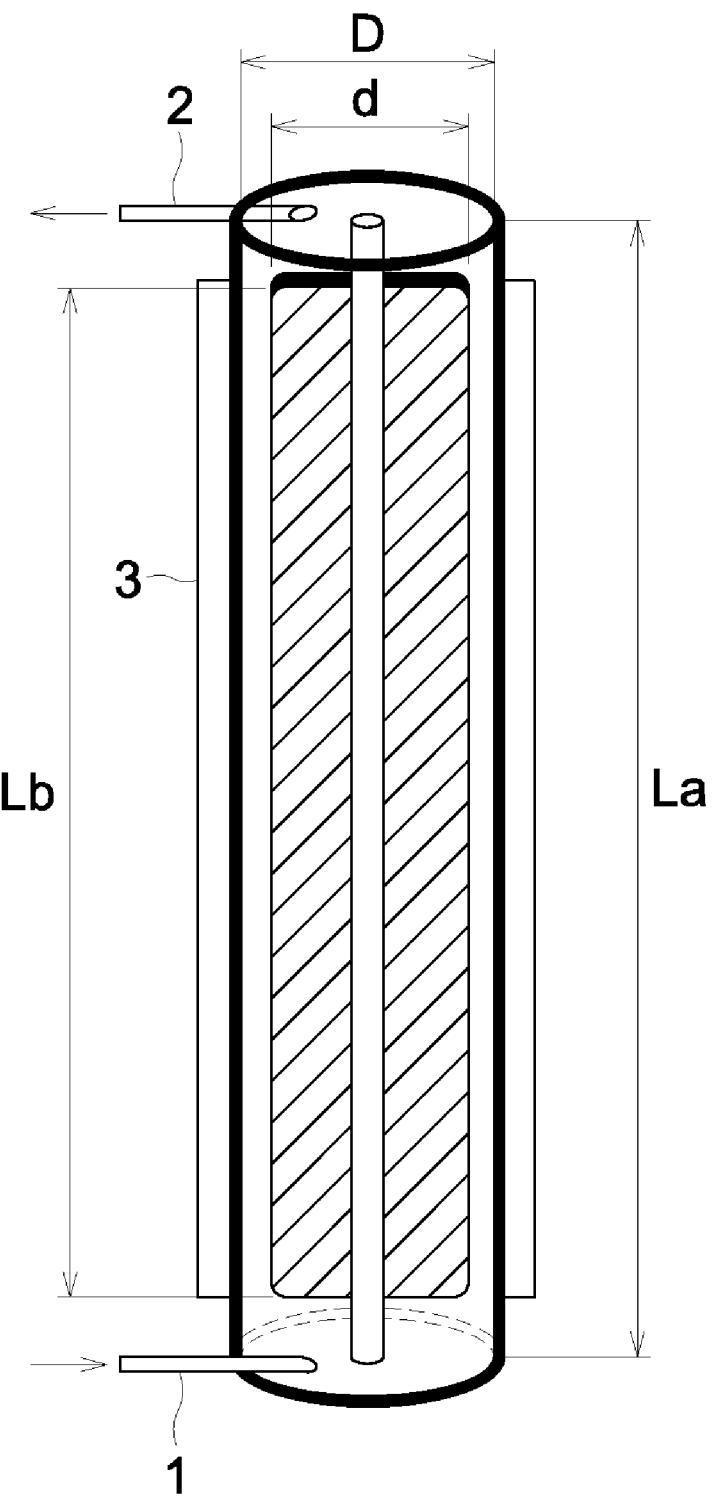
FIG. 1 is a perspective view which shows an example of a tubular flow reactor of the present invention.

When a mixing blade is used to promote a reaction in a tubular flow reactor which produces resin particles by polymerizing a polymerizable monomer, it may be hard to maintain a plug flow property of the polymerizable reactive liquid and there may occur a problem that coarse particles may be mixed in the obtained resin particles and the particle size distribution and the molecular weight distribution will be lack of uniformity.

The present inventors have investigated a tubular flow reactor which can produce uniform resin particles having a narrow particle size distribution and a narrow molecular weight distribution without containing coarse particles, by maintaining a plug flow property of a polymerizable reactive liquid even when the mixing blade is employed.

The reason of failing to maintain the plug flow property when the polymerizable reactive liquid containing a polymerizable monomer is mixed using a mixing blade is supposed to occur by the fact that the flow in the direction of the mixing shaft will be produced at the moment of collision of the polymerizable reactive liquid to the mixing blade.

This flow in the direction of the mixing shaft tends to be generated: when the reactor has a structure which is likely to from a remaining liquid at the attaching portion of the mixing blade to the mixing shaft; or the collision angle between the liquid flow direction and the mixing blade is large.

The present inventors have assumed that the plug flow property will be maintained by reducing the flow in the direction of the mixing shaft through decrease of the liquid remaining portions and by making small the collision angle of the liquid flow to the mixing blade plane. And an adequate form of the reactor was investigated.

As a result of various examinations, it was fount that there can be obtained uniform resin particles having a narrow particle size distribution and a narrow molecular weight distribution without containing coarse particles when the following tubular flow reactor is used. In addition, it was found that the toner using the uniform resin particles thus prepared will reduce fog formation and toner scattering.

The tubular flow reactor of the present invention has a mixing blade attached to a mixing shaft and a cylindrical channel, wherein the tubular flow reactor satisfy the following requirements:

$t<2C$ $t/2C<A/C\leq 1$, provided that C is a radius of the mixing shaft, t is a thickness of the mixing blade, A is a distance between a mixing blade plane B located at a forward position in a rotating direction of the mixing blade and a plane S passing through the center of the mixing shaft in a shaft direction and parallel to the plane B, and the mixing blade plane B is located at a more forward position in the rotating direction than the plane S.

It is preferable that the tubular flow reactor satisfy the following requirement:

$0.80\leq Lb/La\leq 0.99$, provided that La is a length of the cylindrical channel and Lb is a length of the mixing blade.

It is preferable that the tubular flow reactor satisfy the following requirement:

$1\leq La/D\leq 100$, provided that La is a length of the cylindrical channel and D is an inside diameter of the cylindrical channel.

It is preferable that the tubular flow reactor satisfy the following requirement:

$0.3\leq d/D\leq 0.9$, provided that D is an inside diameter of the cylindrical channel and d is a diameter of the mixing blade.

It is preferable that the tubular flow reactor satisfy the following requirement:

$0.1\leq C/d\leq 0.4$ provided that C is a radius of the mixing shaft and d is a diameter of the mixing blade By making a tubular flow reactor to have the above-mentioned composition, it becomes possible to reduce the liquid remaining portions and to make small the collision angle between the liquid flow direction and the mixing blade, as a result it is possible to increase the flow in the radial direction and to reduce the flow in the shaft direction, and plug flow property can be maintained.

Hereafter, the tubular flow reactor of the present invention will be described.

The tubular flow reactor of the present invention is a reactor containing a cylindrical channel provided therein a mixing blade, and has a plug flow property (pressed flow property). The tubular flow reactor of the present invention is suitable for the reaction which depends on time, for example, it is suitable for the polymerization reaction to produce resin particles, such as suspension polymerization and emulsion polymerization.

FIG. 1 is a perspective view which shows an example of a tubular flow reactor of the present invention.

In FIG. 1, 1 is an inlet of a polymerizable reactive liquid, 2 is an outlet of resin particles, 3 is a jacket, D is an inside diameter of the cylindrical channel; La is a length of the cylindrical channel; d is a diameter of the mixing blade; and Lb is a length of the mixing blade.

The tubular flow reactor of the present invention is preferably provided with a jacket which can heat or cool the polymerizable reactive liquid.

The substance of the cylindrical channel and the mixing blade in the tubular flow reactor is preferably subjected to a surface treatment which is excellent in corrosion resistance and is hard to be attached with dirt. Specifically, the mixing blade is preferably subjected to glass lining treatment or fluorinated resin treatment.

Figure 2:
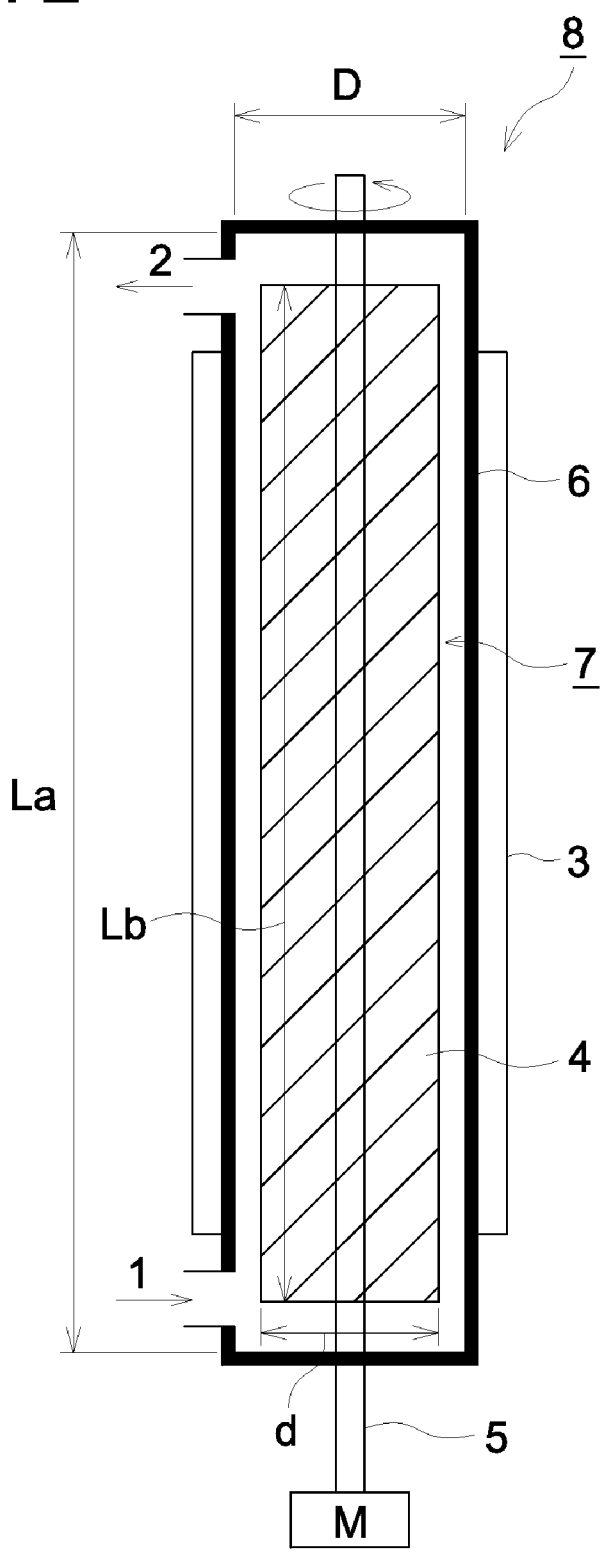
FIG. 2 is a cross-sectional drawing in the direction of the flow showing an example of a tubular flow reactor of the present invention.

FIG. 2 is a cross-sectional drawing in the direction of the flow direction which shows an example of a tubular flow reactor of the present invention.

In FIG. 2, 1 is an inlet of a polymerizable reactive liquid, 2 is an outlet of resin particles, 3 is a jacket, 4 is a mixing blade, 5 is a mixing shaft, 6 is a cylindrical channel, 7 is a plug flow portion, 8 is a tabular flow reactor, D is an inside diameter of the cylindrical channel; d is a diameter of the mixing blade; La is a length of the cylindrical channel; and Lb is a length of the mixing blade.

Figure 3:
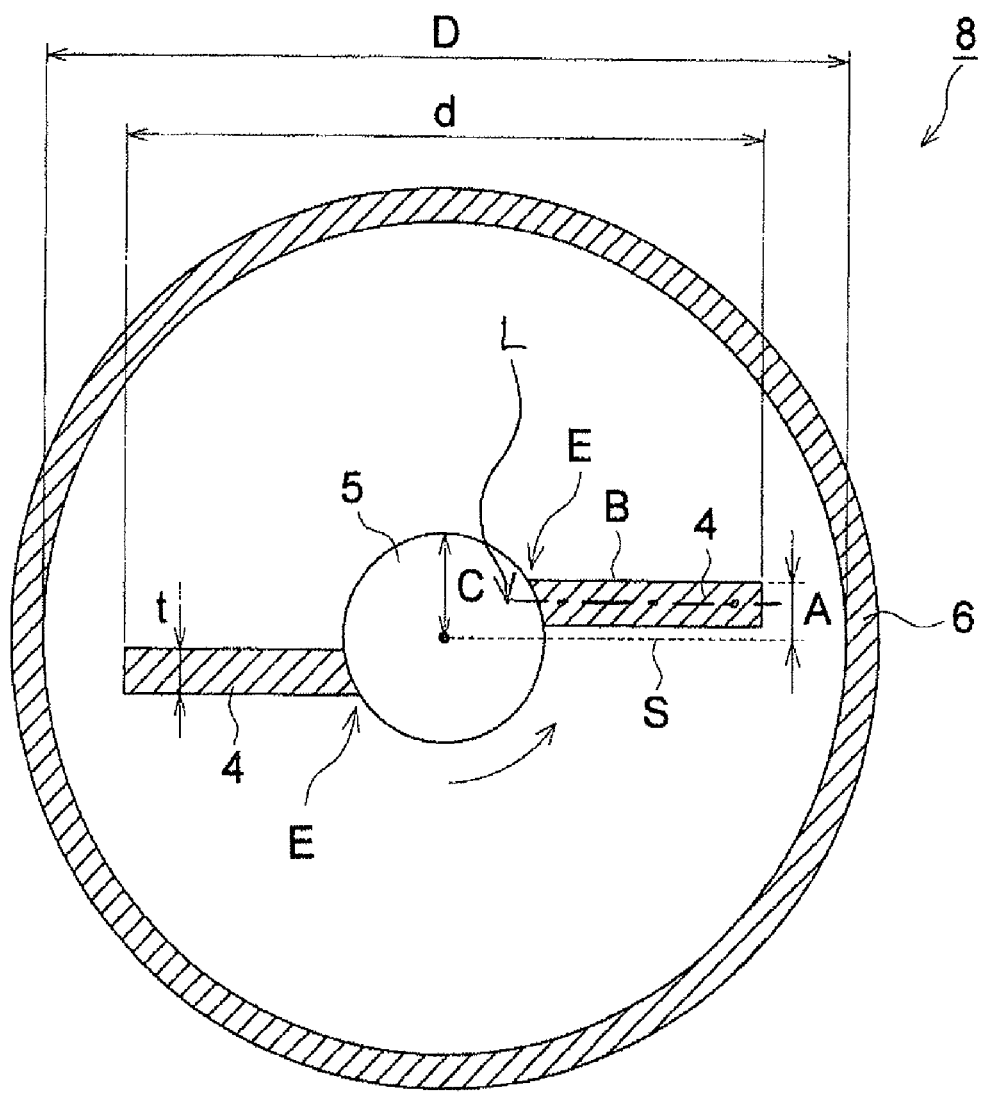
FIG. 3 is a cross-sectional drawing in the direction perpendicular to the flow showing an example of a tubular flow reactor of the present invention.

FIG. 3 is a cross-sectional drawing in the direction perpendicular to the flow direction which shows an example of a tubular flow reactor of the present invention.

In FIG. 3, 4 is a mixing blade, 5 is a mixing shaft, 6 is a cylindrical channel, 8 is a tabular flow reactor, D is an inside diameter of the cylindrical channel; d is a diameter of the mixing blade; t is a thickness of the mixing blade, C is a radius of the mixing shaft, B is a mixing blade plane facing toward the rotating direction, S is a plane passing through the center of the mixing shaft in a shaft direction and parallel to the mixing blade, A is a distance between B and S, when the plane B and the plane S are parallel, E is a liquid remaining portion, and an arrow is a rotating direction.

In addition, the mixing blade plane B is located at a more forward position in the rotating direction than the plane S passing through the center of the mixing shaft.

By using the tubular flow reactor shown in FIG. 3, it is possible to maintain the plug flow property. Further, it is possible to decrease an amount of the remaining liquid generated at the portion of connecting the mixing blade with the mixing shaft to result in making all of the liquid to have the same residence time in the reactor.

Figure 4:
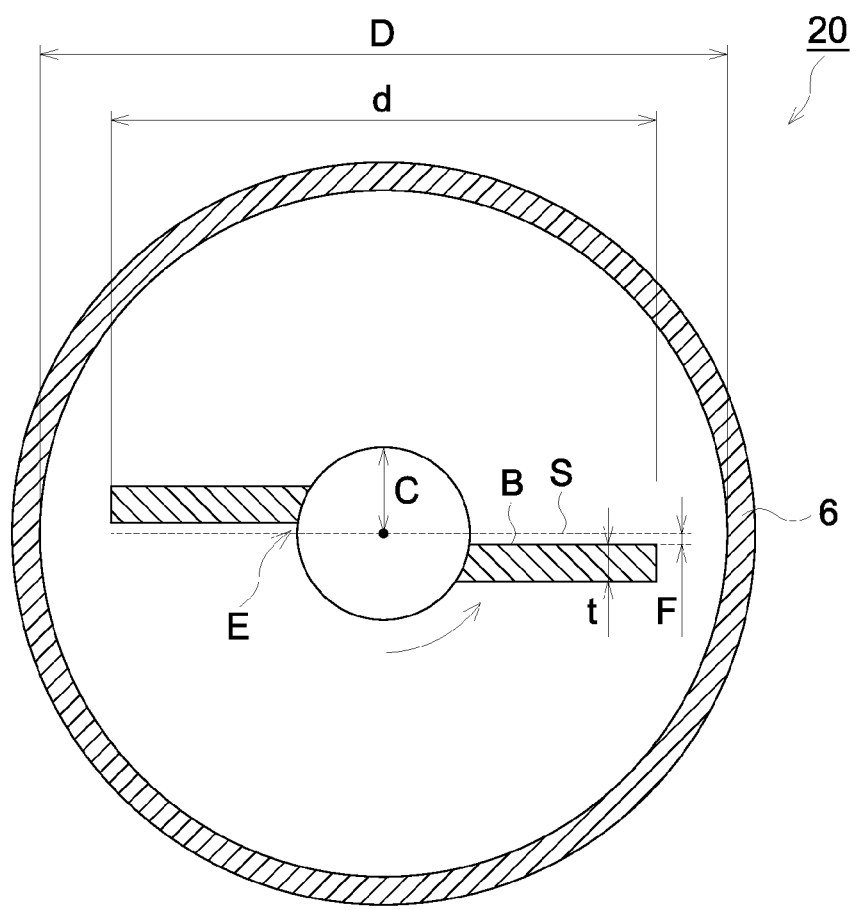
FIG. 4 is a cross-sectional drawing in the direction perpendicular to the flow showing a comparative example of a tubular flow reactor.

FIG. 4 is a cross-sectional drawing in the direction perpendicular to the flow showing a comparative example of a tubular flow reactor.

In FIG. 4, 4 is a mixing blade, 5 is a mixing shaft, 6 is a cylindrical channel, 20 is a tabular flow reactor, D is an inside diameter of the cylindrical channel; d is a diameter of the mixing blade; t is a thickness of the mixing blade, C is a radius of the mixing shaft, B is a mixing blade plane located in a forward position in the rotating direction of the mixing blade, S is a plane passing through the center of the mixing shaft and parallel to B, A is a distance between B and S, E is a liquid remaining portion, and an arrow is a rotating direction.

The plane S passing through the center of the mixing shaft is located at a more forward position in the rotating direction than the mixing blade plane B.

When the tubular flow reactor shown in FIG. 4 is used, there will be increased an amount of the remaining liquid generated at the portion of connecting the mixing blade with the mixing shaft. As a result, it is difficult to make the whole polymerizable reactive liquid to have the same residence time in the reactor Hereafter, the composition of the tubular flow reactor of the present invention will be described.

1. The relationship between a thickness of the mixing blade (t) and a diameter of the mixing shaft (2C)

The thickness of the mixing blade (t) is characterized in that it is smaller than the diameter of the mixing shaft (2C): $t<2C$.

2. The relationship between a thickness of the mixing blade (t), a diameter of the mixing shaft (2C), a distance (A) and a radius of the mixing shaft (C)

The tubular flow reactor of the present invention satisfies the following relationship:

$t/2C<A/C\leq 1$.

The value of t/2C is preferably from 0.04 to 0.60, and it is more preferably from 0.05 to 0.30.

The value of A/C is preferably from 0.06 to 1.00, and it is more preferably from 0.50 to 1.00.

By satisfying the relationship: $t/2C<A/C\leq 1$, it is possible to shift the mixing blade plane B to the forward direction in the rotating direction of the mixing blade with respect to the plane S which passes through the mixing shaft and parallel to the mixing blade plane B. This structure makes it possible to achieve the collision angle between the mixing blade plane B and the flowing direction in the reactor to be small, thereby the flows to the upper and lower directions in the reactor can be prevented.

3. The mixing blade plane B is located at a more forward position in the rotating direction of the mixing blade than the plane S passing though the center of the mixing shaft.

By setting the mixing blade plane B located at a more forward position in the rotating direction of the mixing blade than the plane S passing though the center of the mixing shaft, it is possible to achieve the collision angle between the mixing blade plane and the flowing direction in the reactor to be small to result in preventing the flows to the upper and lower directions in the reactor.

The number of the mixing blade is not specifically limited, it is sufficient to have at least one mixing blade. More preferably, the number of the mixing blades is from 2 to 4.

4. The relationship between a length of the cylindrical channel (La) and a length of the mixing blade (Lb)

By setting the ratio (Lb/La) of a length of the mixing blade (Lb) to a length of the cylindrical channel (La) to be from 0.80 to 0.99, it is possible to prevent the flows to the upper and lower directions in the reactor to result in maintaining a plug flow property of a polymerizable reactive liquid. As a result, promotion of both heat transfer and reaction can be achieved. In order to achieve a further effect to prevent the flows to the upper and lower directions in the reactor, it is more preferable that the ratio (Lb/La) is from 0.90 to 0.99.

When (Lb/La) is smaller than 0.80, it is difficult to obtain the mixing effect in the portion of the reactor having no mixing blade.

5. The relationship between a length of the cylindrical channel (La) and an inside diameter of the cylindrical channel (D)

The ratio (La/D) of a length of the cylindrical channel (La) to an inside diameter of the cylindrical channel (D) is preferable to be from 1 to 100, it is more preferable to be from 5 to 20.

By decreasing the ratio (La/D), the plug flow property will not be favorably affected. However, this is favorable since it will enable to achieve downsizing the whole apparatus. By increasing the ratio (La/D), the plug flow property will be favorably affected. However, this is not favorable from the viewpoint of economic aspect (cost of the apparatus).

6. The relationship (d/D) between an inside diameter of the cylindrical channel (D) and a diameter of the mixing blade (d)

The ratio (d/D) of a diameter of the mixing blade (d) to an inside diameter of the cylindrical channel (D) is preferably from 0.3 to 0.9, and it is more preferably from 0.5 to 0.7.

By setting the value d/D in the above-described range, mixing of the polymerizable reactive liquid in the cylindrical channel can be promoted and heat convection in the cylindrical channel can be prevented. By strengthening the liquid flow in a radial direction of the channel rather than in an axis direction of the channel, it can be prevented the deterioration of a plug flow property or the divergence of the residence time caused by the difference of specific gravity among the raw materials in the polymerizable reactive liquid. Thus, setting the value d/D in the above-described range will produce a favorable result.

When d/D is smaller than 0.3, sufficient mixing effect cannot be obtained. When d/D is larger than 0.9, the gap between the wall of the cylindrical channel and the end of the mixing blade will become too small, and the flow of the liquid will be disturbed, and it will not be favorable.

7. The relationship between a radius of the mixing shaft (C) and a diameter of the mixing blade (d)

The ratio (C/d) of a radius of the mixing shaft (C) to a diameter of the mixing blade (d) is preferably to be from 0.1 to 0.4, it is more preferably to be from 0.2 to 0.3.

By setting the value C/d in the above-described range, the length of the mixing blade can be increased and the distance of A can be increased. These will effective to prevent the liquid flow in the axis direction of the reactor.

When the mixing shaft is large with respect to the mixing blade, the length of the mixing blade becomes small, which will result in decreased mixing effect.

It is possible to provide a strengthening portion at the place where the mixing blade is attached to the mixing shaft for decreasing an amount of the remaining liquid as well as for providing strength. It is also possible to make round the edge of the mixing blade in order to decrease the disturbance of the liquid between the wall of the cylindrical channel and the end of the mixing blade.

When the length of the mixing blade is large and the diameter of the mixing blade is large, it is preferable to use a mixing blade having a slit thereon.

When resin particles are produced using the tubular flow reactor of the present invention, it can maintains a plug flow property even when the apparatus is downsized. It can keep uniform the residence time of the polymerizable reactive liquid in the apparatus and it can keep the residence time constant. As a result, the resin particles are provided with the following features: decreased formation of coarse particles; narrow particle size distribution (CV value of less than 20%, measured based on volume average molecular weight); narrow molecular weight distribution (Mn/Mw of 2.5 or less, Mw: weight average molecular weight, and Mn: number average molecular weight).

Next, there will be described a continuous production apparatus which produces resin particles continuously using a tubular flow reactor of the present invention.

(Continuous Production Apparatus which Produces Resin Particles)

The continuous production apparatus which produces resin particles is mainly composed of an oil droplet dispersion preparation apparatus and a tubular flow reactor.

The tubular flow reactor is provided with: a device to feed a reactive liquid containing a polymerizable monomer, a device to rotate the mixing blade; a device to take out the liquid containing the resin particles after finishing the reaction; and incidental facilities such as a controlling device to control the reaction.

Figure 5:
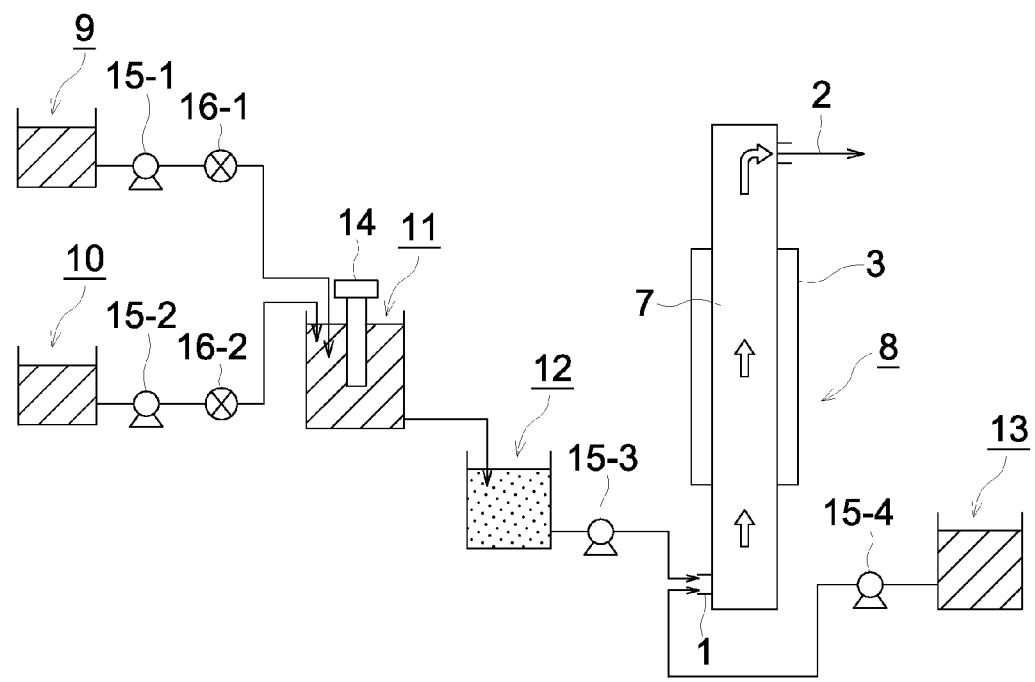
FIG. 5 is a schematic drawing which shows an example of a continuous production apparatus for producing resin particles employing an oil droplet dispersion producing device and a tubular flow reactor.

FIG. 5 shows an example of a schematic drawing of a continuous production apparatus of resin particles employing an oil droplet dispersion preparation apparatus and a tubular flow reactor.

In FIG. 5, the cited reference numerals denote as follows:
8: tubular flow reactor;
9: tank in which a polymerizable monomer and a chain transfer agent are dissolved;
10: tank for the surface active agent solution;
11: oil droplet dispersion preparation apparatus;
12: stock tank for the oil droplet dispersion;
13: tank for the polymerization initiator solution;
14: oil droplet preparation apparatus
15-1, 15-2, 15-3 and 15-4: metering pumps;
16-1 and 16-2: valves.

There will be described a method for continuously producing resin particles by using a tubular flow reactor of the present invention.

The resin particles concerning with the present invention are produced by the following steps:

1. a step where a polymerizable monomer and a reaction transfer agent are blended and dissolved, and the resulting solution is stored in a tank;

2. a step where a surface active agent is dissolved in water, and the resulting solution is stored in a tank;

3. a step where the solution, in which a polymerizable monomer and a reaction transfer agent are blended and dissolved, and the aqueous solution of a surface active agent are introduced into an oil droplet dispersion preparation apparatus through valves, and then oil droplet dispersion exhibiting the oil droplet size of 50 to 500 μm is prepared via a dispersing apparatus;

4. a step where the oil droplet dispersion is temporarily stored in a tank;

5. a step where resin particles are produced in such a manner that the oil droplet dispersion in the stock tank for the oil droplet dispersion and the polymerization initiator solution are continuously introduced into the tubular flow reactor through valves, after which continuous polymerization is carried out by regulating conditions such as a rotating speed of the mixing blade, a residence time in the tubular flow reactor and a polymerization reaction temperature, 6. a step where the resulting solution incorporating the resin particles is taken out via an outlet.

Here, a polymerizable reactive liquid is a mixed solution of an oil droplet dispersion and a polymerization initiator solution.

<Preparation Apparatus of Oil Droplet Dispersion>

To prepare an oil droplet dispersion exhibiting a specific oil droplet size, an oil droplet dispersion preparation apparatus 11 shown in FIG. 5 is employed, in which a polymerizable monomer and if required a chain transfer agent or a solution of a chain transfer agent are dispersed into a surface active agent solution.

As an oil droplet preparation apparatus 14, there are cited, for example, mechanical dispersing apparatuses such as a mixer equipped with a high speed rotor (e.g., Clearmix, produced by M-Technique Co., Ltd.), an ultrasonic dispersing apparatus, a mechanical homogenizer, a Manton-Gaulin homogenizer, and a pressure homogenizer. Of these, the ultrasonic dispersing apparatus, which enables easy achievement of the targeted oil droplet size, is preferred.

Since an oil droplet size depends on the shape of a vibration element and the output of an ultrasonic dispersing apparatus, a solution formula to prepare an oil droplet or an aqueous solution formula of a surface active agent, the processing conditions of the oil droplet dispersion preparation apparatus are appropriately regulated to achieve the targeted oil droplet size.

An oil droplet having a size of 50 to 500 μm is, preferably used. Oil droplets whose sizes are controlled to remain within the above size range stably remain dispersed.

The determination of the oil droplet size may be performed via a commercially available particle size measuring apparatus which uses methods such as a light scattering method, a laser diffraction scattering method, and a laser Doppler method. As a specific particle size measuring apparatus, Microtrack MT3300 (manufactured by Nikkiso Co., Ltd.) and LA-750 (manufactured by Horiba Co., Ltd.) are usable.

<Tubular Flow Reactor>

Tubular flow reactor 8 shown in FIG. 5 will be described.

Tubular flow reactor 8 is an apparatus containing the following sub-systems:

(i) a sub-system which feeds the prepared oil droplet dispersion and a polymerization initiator solution into the tubular flow reactor through inlet 1;

(ii) a sub-system where the fed solution is subjected to a plug flow in plug flow section 7 while heated with jacket 3 to produce resin particles via polymerization reaction; and (iii) a sub-system to take out the solution incorporating the resin particle through outlet 2.

The dimensions and the form of the tubular flow reactor are shown below.

Inside diameter of the cylindrical channel (D): 110 mm
Diameter of the mixing blade (length) (d): 80 mm
Thickness of the mixing blade (t): 4 mm
Radius of the mixing shaft (C): 24 mm
The distance (A) between the mixing blade plane (B) located at a forward position in a rotating direction of the mixing blade and the plane (S) passing through the center of the mixing shaft and parallel to the plane (B): 12 mm
Length of the cylindrical channel (La): 400 mm
Length of the mixing blade (Lb): 380 mm Here, the mixing blade plane B is located at a more forward position in the rotating direction of the mixing blade than the plane S passing though the center of the mixing shaft.

This tubular flow reactor satisfies the following relationships.

1. $t<2C$ ($-4<2\times24$)
2. $t/2C<A/C\leq1$ ($=4/(2\times24)<12/24\leq1$)

3. The mixing blade plane (B) is located at the forward position of the rotating direction with respect to the plane (S) passing through the center of the mixing shaft
4. Lb/La=380/400=0.95
5. La/D=400/110=3.63
6. d/D=80/110=0.73
7. C/d=24/80=0.3

In production of resin particles via the continuous production reactor, conditions such as a rotating speed of the mixing blade, a residence time in the reactor, a reaction temperature, and raw materials a feeding rate of a polymerizable reactive liquid are set so that the targeted resin particle can be produced. Specifically, it is preferable that the following conditions are fulfilled.

The residence time in the tubular flow reactor is preferably from 5 to 200 minutes, and more preferably from 10 to 120 minutes.

The reaction temperature is preferably from 60 to 98° C.

The feeding rate of a polymerizable reactive liquid is preferably from 10 to 10,000 cm$^3$/min.

The rotating speed of the mixing blade is preferably from 5 to 400 rpm.

Here, the rotating speed of the mixing blade is determined depending on the type of polymerizable reactive liquid, the reaction temperature, the feeding rate and the dimension of the tubular flow reactor.

In addition, the above-described conditions are appropriately set depending on types and amounts to be used of the polymerizable monomer, the chain transfer agent, the surface active agent, and the polymerization initiator.

A polymerizable monomer, a chain transfer agent, a surface active agent, and a polymerization initiator, all of which are employed in production of resin particles, are described below.

(Polyrnerizable Monomer)

Resin particles of the present invention are composed of a polymer obtained via polymerization of at least one type of polymerizable monomer. The above-described polymerizable monomers include styrene or styrene derivatives, such as styrene, o-methylstyrene, m-methylstyrene, p-methylstyrene, α-methylstyrene, p-chlorostyrene, 3,4-dichlorostyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene; methacrylic acid ester derivatives, such as methyl methacrylate, ethyl methacrylate, n-butyl methacrylate, iso-propyl methacrylate, iso-butyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate; acrylic acid ester derivatives, such as methyl acrylate, ethyl acrylate, iso-propyl acrylate, n-butyl acrylate, t-butyl acrylate, iso-butyl acrylate, n-octyl acrylate, 2-ethylhexyl acrylate, stearyl acrylate, lauryl acrylate, and phenyl acrylate; olefins, such as ethylene, propylene, and isobutylene; vinyl esters, such as vinyl propionate, vinyl acetate, and vinyl benzoate; vinyl ethers, such as vinyl methyl ether, and vinyl ethyl ether; vinyl ketones, such as vinyl methyl ketone, vinyl ethyl ketone, and vinyl hexyl ketone; N-vinyl compounds, such as N-vinyl carbazole, N-vinyl indole, and N-vinyl pyrrolidone; vinyl compounds, such as vinylnaphthalene, and vinylpyridine; and acrylic acids or methacrylic acid derivatives, such as acrylonitrile, methacrylonitrile, and acrylamide. These vinyl monomers may be used either individually or in combinations thereof.

Further, a polymerizable monomer featuring an ionic dissociable group is preferably combined with the above monomer to constitute the resin. Examples of such polymerizable monomers are those having a substituent such as a carboxyl group, a sulfonic acid group, and a phosphoric acid group as the constituting group of the monomer. Specific examples of such polymerizable monomers include acrylic acid, methacrylic acid, maleic acid, itaconic acid, cinnamic acid, fumaric acid, maleic acid mono-alkyl ester, itaconic acid mono-alkyl ester, styrenesulfonic acid, allylsufosuccinic acid, 2-acrylamido-2-methylpropane sulfonic acid, acid phosphooxyethyl methacrylate, and 3-chloro-2-acid-phosphooxypropyl methacrylate.

Further, resins featuring a crosslinked structure using multi-functional vinyls are usable. Examples of such multi-functional vinyls include divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, and neopentyl glycol diacrylate.

(Polymerization Initiator)

The above-described polymerizable monomers can be polymerized using a polymerization initiator.

When a suspension polymerization method is used for production of resin particles, an oil soluble polymerization initiator can be used. Specific examples of an oil soluble polymerization initiator include: azo type or diazo type polymerization initiators such as 2,2'-azobis-(2,4-dimethylvaleronitrile), 2,2'-azobisisobutyronitrile, 1,1'-azobis-(cyclohexane-1-carbonitrile), 2,2'-azobis-4-methoxy-2,4-dimethylvaleronitrile, and azobisisobutyronitrile; peroxide type polymerization initiators such as benzoyl peroxide, methylethylketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine; and polymer initiators having peroxide in side chains.

When an emulsion polymerization method is used for production of resin particles, a water soluble polymerization initiator can be used. Examples of a water soluble polymerization initiator include: persulfate salts such as potassium persulfate and ammonium persulfate and hydrogen peroxide, azobisamidinopropane acetate, azobiscyanovaleric acid and salts thereof; and hydrogen peroxide.

It is preferable that the amount of the polymerizaion initiator is 0.1 to 10.0 weight % with respect to the weight of the polymerizable monomer.

(Chain Transfer Agent)

Examples of a chain transfer agent include: 1-octanethiol, ethanethiol, t-octylmercaptan, t-dodecylmercaptan and benzothiazole.

The amount of the chain transfer agent to be used is preferably 0.5 to 5.0 weight % with respect to the weight of the polymerizable monomer.

(Surface Active Agent)

A surface active agent is employed to disperse a solution incorporating a polymerizable monomer and a chain transfer agent into an aqueous solution to form oil droplets. Examples of the preferred surface active agents include, but are not particularly limited to, the ionic surface active agents listed below.

Examples of the ionic surface active agents include sulfonic acid salts (such as sodium dodecylbenzenesulfonate, sodium arylalkyl polyethersulfonate, sodium 3,3-disulfon-diphenylurea-4,4-diazo-bis-amino-8-naphthol-6-sulfonate, ortho-caroxybenzene-azo-dimethylaniline, and sodium 2,2, 5,5-tetramethyl-triphenylmethane-4,4-diazi-bis-(3-naphthol-6-sulfonate); sulfuric acid ester salts (such as sodium dodecylsulfate, sodium tetradecylsulfate, sodium pentadecylsulfate, and sodium octylsulfate); as well as fatty acid salts (such as sodium oleate, sodium laurate, sodium caprate, sodium caprylate, sodium caproate, potassium stearate, and calcium oleate).

Further, a nonionic surface active agent may also be employed. Specific examples of the nonionic surface active agent include polyethylene oxide, polypropylene oxide, a combination of polypropylene oxide and polyethylene oxide, esters of polyethylene glycol with higher fatty acids, alkylphenol polyethylene oxide, esters of higher fatty acids with polyethylene glycol, esters of higher fatty acids with polypropylene oxides, and sorbitan esters.

Subsequently, characteristics of resin particles are described.

(Molecular Weight Distribution: (Mw/Mn))

When the polymerizable monomer is polymerized in the tubular flow reactor of the present invention, the resin particles having a weight average molecular weight (Mw) of 10,000 to 15,000 can be suitable obtained. And the resin particles having the ratio between a weight average molecular weight (Mw) and a number average molecular weight (Mn), (Mw/Mn) (molecular weight distribution) being in the range of 2.5 or less can be suitable obtained.

The molecular weight of the resin particles may be determined via, for example, gel permeation chromatography (GPC) employing a tetrahydrofuran (THF) as a column solvent.

The specific determination method of the molecular weight of the resin particles via gel permeation chromatography (GPC) is done as follows. A measured sample is dissolved into tetrahydrofuran to obtain a solution having a density of 1 mg of the sample in 1 ml of THF, and the solution is stirred using a ultrasonic dispersion apparatus at mom temperature for 5 minutes, and then, the resulting solution is subjected to filtration through a membrane filter having a pore size of 0.2 μm, followed by injection into the GPC with an amount of 10μL. The GPC measurement is carried out under measurement conditions specified below.

Apparatus: HLC-8220 (manufactured by Tosoh Co., Ltd.)
Column: TSK guard column+TSK gel Super HZM-M3 continuous (manufactured by Tosoh Co., Ltd.)
Column temperature: 40° C.
Solvent: tetrahydrofuran
Flow speed: 0.2 ml/min.
Detector: Refractive index detector (RI detector)

In the determination of the molecular weight of samples, the molecular weight distribution of the sample is calculated employing a calibration curve which is prepared employing monodispersed polystyrene standard particles. About ten types of such polystyrene standard particles are used to prepare the calibration curve.

(Particle Size Distribution)

The particle size of resin particles to be provided may be 50 nm to 500 μm with respect to volume based median size ($D_{50}$). "Volume based median size" denotes a particle size where a counted number (e.g., accumulative frequency) corresponds to 50% of the total number of particles, where the number of particle size exhibiting a specific volume is counted in descending order or in ascending order.

The coefficient of variation, (hereinafter also referred to as CV value) in the volume based particle distribution of the resin particles constituting the resin particles to be provided, may 20% or less. Particle distribution of resin particles exhibiting the coefficient of variation of the above region becomes narrow.

The coefficient of variation of resin particles in the volume based particle distribution may be calculated by the formula below.

Coefficient of variation (CV value)(%)=[(standard deviation in volume based particle distribution)/(volume based median size ($D_{50}$))]×100

The volume based median size ($D_{50}$) and the coefficient of variation (CV value) of the resin particle of the present invention are measured and calculated via an apparatus, such as Multisizer III (manufactured by Beckman Coulter Inc.) connected with a computer system for data processing (also manufactured by Beckman Coulter Inc.), or Microtrack UPA-150 (manufactured by Nikkiso Co., Ltd.).

A measuring instrument and measurement conditions are chosen and performed so that a measurement range may be suitable for the resin particulates obtained.

(Amount of Coarse Particles in Resin Particles)

An amount of the coarse particles in the resin particles of the present invention indicates a weight of the coarse particles contained in the obtained resin particles.

The amount of coarse particles in the resin particles is the value obtained from the remained weight on a sieve and the passed weight through the sieve after passing the resin particles dispersion through the sieve having a 50 μm aperture. The value is calculated from the following formula.

Formula:
Weight % of coarse particles in resin particles=
[Weight remained on a sieve/(Weight of resin particles passed through the sieve+weight remained on the sieve)]×100.

Since the resin particles produced according to the present invention can reduce the formation of coarse particles and has a particle size distribution and a molecular weight distribution as described above, they are usable, for example, as a raw material for a toner and a spacer used in a liquid crystal.

EXAMPLES

The invention is detailed below with reference to examples, but the present invention is not limited to them.
<<Preparation of Resin particles>>
Resin particles were produced as below.
<Preparation of Resin Particle 1>
Resin particles were produced via the steps described below, employing the continuous production apparatus of resin particles (Tubular flow reactor 8) as shown in FIG. 3.
(1) Preparation of Surface Active Agent Solution
The materials below were blended and dissolved to prepare a surface active agent solution.

| Sodium dodecylsulfate | 0.8 weight parts |
| Ion exchanged water | 539.2 weight parts |

(2) Preparation of Polymerizable Monomer Solution
The materials below were blended and dissolved to prepare a polymerizable monomer solution.

| Styrene | 67.7 weight parts |
| n-Butyl acrylate | 19.9 weight parts |
| Methacrylic acid | 10.9 weight parts |
| t-Octylmercaptan | 2.2 weight parts |

(3) Preparation of Oil Droplet Dispersion
The polymerizable monomer solution prepared above was dispersed in the surface active agent solution employing a mechanical dispersion apparatus (US homogenizer 300T: manufactured by Nissei Corp.) to an oil droplet size of 100 nm, to prepare the oil droplet dispersion.

(4) Preparation of Polymerization Initiator Solution

The materials below were blended and dissolved to prepare a polymerization initiator solution.

| | |
|---|---|
| Polymerization initiator (potassium persulfate) | 9.2 weight parts |
| Ion exchanged water | 200.0 parts by mass |

(5) Polymerization Step

A tubular flow reactor, which is a part of the continuous production apparatus of resin particles as shown in the aforesaid FIG. 5, having: inside diameter of the cylindrical channel (D); length of the cylindrical channel (La); diameter of the mixing blade (d); length of the mixing blade (Lb); radius of the mixing shaft (C); thickness of the mixing blade (t); and distance (A) between the mixing blade plane (B) and the plane (S) passing through the center of the mixing shaft as described below.

Length of the cylindrical channel (La): 400 mm
Length of the mixing blade (Lb): 380 mm
Inside diameter of the cylindrical channel (D): 110 mm
Diameter of the mixing blade (d): 80 mm
Radius of the mixing shaft (C): 24 mm
Thickness of the mixing blade (t): 4 mm
Distance (A) between the mixing blade plane (B) and the plane (S) passing though the center of the mixing shaft: 12 mm
Number of the mixing blade: 2

The oil droplet dispersion prepared above was continuously introduced at a rate of 80 cm³/min. through the inlet 1 of an oil droplet dispersion which is arranged at the tubular flow reactor 8, and at the same time the polymerization initiator solution was continuously introduced at a rate of 15 cm³/min., and then the rotating speed of mixing was set to 10 rpm, the interior temperature of the plug flow section 7 was set to 90° C., and the residence time of the plug flow section 7 was set to 40 min. respectively, followed by carrying out of continuous polymerization to prepare resin particles, which are referred to as "Resin Particle 1".

<Preparation of Resin Particles 2 to 19>

Resin particles were prepared in the same manner as preparation of Resin Particle 1 except that the dimensions of the tubular flow reactor employed Resin Particle 1 were changed to those described in Table 1. The prepared resin particles are referred to as "Resin Particles 2 to 19".

<Preparation of Resin Particle 20>

Resin particles were prepared in the same manner as preparation of Resin Particle 1 except that the following change was done to the tubular flow reactor: instead of "the mixing blade plane B is located at a more forward position in the rotating direction of the mixing blade than the plane S passing through the center of the mixing shaft", there was used "reactor 20" which was adopted the change that "the plane S passing through the center of the mixing shaft is located at a more forward position in the rotating direction of the mixing blade than the mixing blade plane B" as is shown in FIG. 4 for comparison. Thus obtained resin particles were named as Resin Particle 20.

<Preparation of Resin Particle 21>

Resin particles were prepared in the same manner as preparation of Resin Particle 7 except that "reactor 21" in which the mixing blade was eliminated from the tubular flow reactor was used instead of the reactor used for preparation of Resin Particle 7. Thus obtained resin particles were named as Resin Particle 21.

<Preparation of Resin Particle 22>

Resin particles were prepared in the same manner as preparation of Resin Particle 1 except that "reactor 22" in which the cylindrical tube in the tubular flow reactor was substituted with a tube having a square cross-section (a square shaped tube), and the dimensions of the tubular flow reactor was changed as are shown in Table 1. Thus obtained resin particles were named as Resin Particle 22.

In Table 1, there are shown the dimensions of the tubular flow reactors used for preparing Resin Particles 1 to 22.

TABLE 1

| | Reactor | Radius of the mixing shaft: C (mm) | Thickness of the mixing blade: t (mm) | Distance between Plane B and Plane S: A (mm) | Length of the cylindrical channel: La (mm) | Length of the mixing blade: Lb (mm) | Inside diameter of the cylindrical channel: D (mm) | Diameter of the mixing blade: d (mm) |
|---|---|---|---|---|---|---|---|---|
| Reactor 1 | Cylindrical tube | 24 | 4 | 12 | 400 | 380 | 110 | 80 |
| Reactor 2 | Cylindrical tube | 24 | 2.4 | 12 | 400 | 380 | 110 | 80 |
| Reactor 3 | Cylindrical tube | 24 | 28.8 | 12 | 400 | 380 | 110 | 80 |
| Reactor 4 | Cylindrical tube | 24 | 2 | 12 | 400 | 380 | 110 | 80 |
| Reactor 5 | Cylindrical tube | 24 | 33.6 | 12 | 400 | 380 | 110 | 80 |
| Reactor 6 | Cylindrical tube | 24 | 50 | 12 | 400 | 380 | 110 | 80 |
| Reactor 7 | Cylindrical tube | 24 | 4 | 44 | 400 | 380 | 110 | 80 |
| Reactor 8 | Cylindrical tube | 24 | 4 | 24 | 400 | 380 | 110 | 80 |
| Reactor 9 | Cylindrical tube | 24 | 4 | 1.2 | 400 | 380 | 110 | 80 |
| Reactor 10 | Cylindrical tube | 24 | 4 | 26 | 400 | 380 | 110 | 80 |
| Reactor 11 | Cylindrical tube | 24 | 4 | 12 | 400 | 380 | 110 | 80 |
| Reactor 12 | Cylindrical tube | 24 | 4 | 12 | 400 | 320 | 110 | 80 |
| Reactor 13 | Cylindrical tube | 24 | 4 | 12 | 400 | 96 | 110 | 80 |
| Reactor 14 | Cylindrical tube | 24 | 4 | 12 | 110 | 380 | 110 | 80 |
| Reactor 15 | Cylindrical tube | 24 | 4 | 12 | 11000 | 380 | 110 | 80 |
| Reactor 16 | Cylindrical tube | 24 | 4 | 12 | 400 | 380 | 110 | 33 |
| Reactor 17 | Cylindrical tube | 24 | 4 | 12 | 400 | 380 | 110 | 99 |
| Reactor 18 | Cylindrical tube | 24 | 4 | 12 | 400 | 380 | 480 | 240 |
| Reactor 19 | Cylindrical tube | 24 | 4 | 12 | 400 | 380 | 120 | 60 |
| Reactor 20 | Cylindrical tube | 24 | 4 | −12 | 400 | 380 | 110 | 80 |
| Reactor 21 | Cylindrical tube | — | — | — | 400 | — | 110 | — |
| Reactor 22 | Square shaped tube | 24 | 4 | 12 | 400 | 380 | *1 | 80 |

Notice: In Reactor 20, plane S is located at a position more forward in the rotating direction of the mixing blade than plane B.
*1: Square shaped section having a side length of 97.5 mm.

In Table 2, there are shown the features of Reactors 1 to 22. There are indicated the values of: t/2C, t/2C≦A/C<1, Lb/La, La/D, d/D and C/d. Also, there is indicated the condition whether plane B is located at a more forward position in a rotating direction of the mixing blade than plane S or not, indicated as Yes or No.

TABLE 2

|  | Reactor | t/2C | t/2C < A/C ≦ 1 | Whether Plane B is located at a more forward position in a rotating direction than Plane S | Lb/La | La/D | d/D | C/d |
|---|---|---|---|---|---|---|---|---|
| Reactor 1 | Cylindrical tube | 0.08 | 0.08 < 0.5 ≦ 1 | Yes | 0.95 | 3.6 | 0.73 | 0.3 |
| Reactor 2 | Cylindrical tube | 0.05 | 0.05 < 0.5 ≦ 1 | Yes | 0.95 | 3.6 | 0.73 | 0.3 |
| Reactor 3 | Cylindrical tube | 0.6 | 0.5 > 0.5 ≦ 1 | Yes | 0.95 | 3.6 | 0.73 | 0.3 |
| Reactor 4 | Cylindrical tube | 0.04 | 0.04 > 0.5 ≦ 1 | Yes | 0.95 | 3.6 | 0.73 | 0.3 |
| Reactor 5 | Cylindrical tube | 0.7 | 0.7 > 0.5 ≦ 1 | Yes | 0.95 | 3.6 | 0.73 | 0.3 |
| Reactor 6 | Cylindrical tube | 1.06 | 1.06 > 0.5 ≦ 1 | Yes | 0.95 | 3.6 | 0.73 | 0.3 |
| Reactor 7 | Cylindrical tube | 0.08 | 0.08 > 0.06 ≦ 1 | Yes | 0.95 | 3.6 | 0.73 | 0.3 |
| Reactor 8 | Cylindrical tube | 0.08 | 0.08 < 1 ≦ 1 | Yes | 0.95 | 3.6 | 0.73 | 0.3 |
| Reactor 9 | Cylindrical tube | 0.08 | 0.08 > 0.05 ≦ 1 | Yes | 0.95 | 3.6 | 0.73 | 0.3 |
| Reactor 10 | Cylindrical tube | 0.08 | 0.08 < 1.08 > 1 | Yes | 0.95 | 3.6 | 0.73 | 0.3 |
| Reactor 11 | Cylindrical tube | 0.08 | 0.08 < 0.5 ≦ 1 | Yes | 0.95 | 3.6 | 0.73 | 0.3 |
| Reactor 12 | Cylindrical tube | 0.08 | 0.08 < 0.5 ≦ 1 | Yes | 0.80 | 3.6 | 0.73 | 0.3 |
| Reactor 13 | Cylindrical tube | 0.08 | 0.08 < 0.5 ≦ 1 | Yes | 0.99 | 3.6 | 0.73 | 0.3 |
| Reactor 14 | Cylindrical tube | 0.08 | 0.08 < 0.5 ≦ 1 | Yes | 0.95 | 1 | 0.73 | 0.3 |
| Reactor 15 | Cylindrical tube | 0.08 | 0.08 < 0.5 ≦ 1 | Yes | 0.95 | 100 | 0.73 | 0.3 |
| Reactor 16 | Cylindrical tube | 0.08 | 0.08 < 0.5 ≦ 1 | Yes | 0.95 | 3.6 | 0.30 | 0.3 |
| Reactor 17 | Cylindrical tube | 0.08 | 0.08 < 0.5 ≦ 1 | Yes | 0.95 | 3.6 | 0.90 | 0.3 |
| Reactor 18 | Cylindrical tube | 0.08 | 0.08 < 0.5 ≦ 1 | Yes | 0.95 | 3.6 | 0.73 | 0.1 |
| Reactor 19 | Cylindrical tube | 0.08 | 0.08 < 0.5 ≦ 1 | Yes | 0.95 | 3.6 | 0.73 | 0.4 |
| Reactor 20 | Cylindrical tube | 0.08 | — | No | — | — | — | — |
| Reactor 21 | Cylindrical tube | — | — | — | 0.95 | 3.6 | — | — |
| Reactor 22 | Square shaped tube | 0.08 | 0.08 < 0.5 ≦ 1 | Yes | 0.95 | 3.6 | 0.73 | 0.3 |

<Evaluation of Resin Particles>

In Table 3 are indicated: Reactor number for preparing Resin Particles, amount of coarse particles, particle size, CV value, Mw and Mw/Mn.

TABLE 3

|  | Reactor No. | Resin Particle No. | Amount of coarse particles (weight %) | Particle size (nm) | Particle size CV value(%) | Mw | Mw/Mn |
|---|---|---|---|---|---|---|---|
| Example 1 | Reactor 1 | Resin Particle 1 | 0.02 | 130 | 16 | 13000 | 2.4 |
| Example 2 | Reactor 2 | Resin Particle 2 | 0.1 | 125 | 16 | 12000 | 2.3 |
| Comparative example 1 | Reactor 3 | Resin Particle 3 | 2.2 | 170 | 23 | 15000 | 3.0 |
| Example 3 | Reactor 4 | Resin Particle 4 | 0.9 | 134 | 20 | 12000 | 2.5 |
| Comparative example 2 | Reactor 5 | Resin Particle 5 | 9.1 | 168 | 32 | 21000 | 3.9 |
| Comparative example 3 | Reactor 6 | Resin Particle 6 | 4.5 | 149 | 27 | 17000 | 3.9 |
| Comparative example 4 | Reactor 7 | Resin Particle 7 | 2.7 | 133 | 24 | 14000 | 2.6 |
| Example 4 | Reactor 8 | Resin Particle 8 | 0.7 | 118 | 19 | 10000 | 1.9 |
| Comparative example 5 | Reactor 9 | Resin Particle 9 | 5.0 | 150 | 30 | 24000 | 4.0 |
| Comparative example 6 | Reactor 10 | Resin Particle 10 | 6.3 | 151 | 26 | 20000 | 2.8 |
| Example 5 | Reactor 11 | Resin Particle 11 | 0.4 | 128 | 16 | 15000 | 2.1 |
| Example 6 | Reactor 12 | Resin Particle 12 | 0.7 | 131 | 15 | 11000 | 1.8 |
| Example 7 | Reactor 13 | Resin Particle 13 | 0.7 | 140 | 14 | 13000 | 2.2 |
| Example 8 | Reactor 14 | Resin Particle 14 | 0.5 | 137 | 19 | 15000 | 2.1 |
| Example 9 | Reactor 15 | Resin Particle 15 | 0.04 | 131 | 15 | 12000 | 1.9 |
| Example 10 | Reactor 16 | Resin Particle 16 | 0.9 | 119 | 20 | 16000 | 2.3 |
| Example 11 | Reactor 17 | Resin Particle 17 | 0.3 | 124 | 18 | 16000 | 2.2 |
| Example 12 | Reactor 18 | Resin Particle 18 | 0.6 | 139 | 19 | 12000 | 2.5 |
| Example 13 | Reactor 19 | Resin Particle 19 | 0.2 | 124 | 18 | 13000 | 2.2 |
| Comparative example 7 | Reactor 20 | Resin Particle 20 | 12.5 | 140 | 30 | 13000 | 3.7 |
| Comparative example 8 | Reactor 21 | Resin Particle 21 | 7.2 | 155 | 25 | 12000 | 3.1 |
| Comparative example 9 | Reactor 22 | Resin Particle 22 | 27.0 | 172 | 42 | 24000 | 6.2 |

As characteristic evaluation of the obtained resin particles, the following values were considered to be a success level: amount of coarse particles of 1 weight % or less; CV value of 20% or less; and Mw/Mn of 2.5 or less.

As is shown by Table 3, Resin Particles each prepared in Examples 1 to 13 fall within each success level in the following range of: amount of coarse particles of 1 weight % or less; weight average molecular weight (Mw) being 10,000-15,000; coefficient of variation (CV value) in volume based particle distribution of resin particles being 20% or less; the ratio (Mw/Mn) between a weight average molecular weight (Mw) and a number average molecular weight (Mn) being 2.5 or less; and volume based median size ($D_{50}$) being 80 to 140 nm.

On the other hand, in Comparative examples 1 to 9, it was found that at least one of any of the values of: amount of coarse particles; CV value; and Mw/Mn fell out of the above ranges set as a success level.

The values of: amount of coarse particles; CV value; Mw; Mw/Mn; and particle size were determined via the aforesaid methods.

<<Preparation of Toner>>

Toners were prepared as follows using the Resin Particle as described above.

First, a colorant dispersion containing colorant particles was prepared.

(Preparation of Colorant Dispersion)

While stirring, 90 weight parts of sodium dodecylsulfate were dissolved in 1,600 weight parts of ion-exchanged water. While stirring the resulting solution, 420 weight parts of carbon black having a pH value of 2.5 (Carbon black #1,000, made by Mitsubishi Chemical Co., Ltd.) were gradually added to the above solution. Subsequently, the resulting mixture was dispersed employing stirrer "CLEAR MIX" (produced by M Technique Co., Ltd.), whereby a colorant particle dispersion was prepared. The prepared colorant particle dispersion was designated as "Colorant Dispersion". The diameter of colorant particles in the above Colorant Dispersion was determined employing electrophoretic light scattering photometer "ELS-800" (produced by Otsuka Electronics Co., Ltd.), resulting in 110 nm.

Next, Resin Particle Dispersion for shell formation was prepared.

(Preparation of Resin Particle Dispersion for Shell)

In a reaction vessel fitted with a stirrer, a thermal sensor, a cooling pipe, and a nitrogen introducing unit were placed 2.3 weight parts of sodium dodecylsulfate and 3,000 weight parts of ion exchanged water, and while stirring at 230 rpm under a nitrogen flow, the resulting mixture was heated so that the internal temperature reached 80° C. After the temperature rise, a solution which was prepared by dissolving 10 weight parts of potassium persulfate in 200 weight parts of ion exchanged water, and subsequently, the solution temperature was again elevated to 80° C. After dropping the following monomer mixture solution for one hour, the resulting mixture was heated while stirring at 80° C. for two hours to result in polymerization, whereby resin particles were produced. The resulting resin particles were designated as "Resin Particle Dispersion for Shell".

(Monomer Mixture Solution)

| | |
|---|---|
| Styrene | 520 weight parts |
| n-Butyl acrylate | 210 g weight parts |
| Methacrylic acid | 68 g weight parts |
| n-Octanethiol | 16 g weight parts |

(Aggregation-Fusion Process)

In a reaction vessel fitted with a stirrer, a thermal sensor, a cooling pipe, and a nitrogen introducing unit were placed 340 weight parts in terms of solid of Resin Particle 1 as prepared above, 1,000 weight parts of ion exchanged water and 42 weight parts of "Colorant Dispersion". After regulating the resulting mixture to 30° C., the pH was regulated to 10 by adding a 5 N sodium hydroxide aqueous solution.

Subsequently, while stirring at 230 rpm, there were added an aqueous solution which was prepared by dissolving 60 weight parts of magnesium chloride in 60 weight parts of ion exchanged water at 30° C. for 10 minutes. After maintaining that temperature for 3 minutes, the resulting mixture was heated to 90° C. over 60 minutes, and while maintaining the temperature at 90° C. with a decreased stirring speed of 170 rpm, core particle growth reaction was allowed to continue.

At the moment when the particles grew to have a volume based median size ($D_{50}$) of 4.5 µm, the sting speed was increased to 280 rpm, and there was added 40 weight parts in terms of solid of "Resin Particle Dispersion for Shell" over 10 minutes. Shell formation process was performed by making adsorb the Resin Particle Dispersion for Shell to the circumference of the core particles. 120 minutes after adding Resin Particle Dispersion for Shell, there was added an aqueous solution which was prepared by dissolving 80 weight parts of sodium chloride in 400 weight parts of ion exchanged water so as to stop the shell formation process. Further by heating the resulting mixture at 92° C. while stirring, fusion between particles was allowed to progress until the degree of circularity determined by FPIA-2100 reached 0.945. Thereafter, the temperature of the liquid composition was cooled to 30° C. followed by the adjustment of the pH to 4.0 by the addition of hydrochloric acid, and stirring was terminated. Thus a dispersion of particles having a core-shell structure was prepared. The obtained dispersion was called as "Toner Host Particle Dispersion 1"

(Washing-Drying Process)

Particles formed via the aggregation-fusion process were subjected to solid liquid separation employing basket type centrifuge "MARK III TYPE MODEL No. 60×40" (produced by Matsumoto Kikai Mfg. Co., Ltd.), whereby a wet cake of toner host particles was formed. The above cake was washed with ion exchanged water at 40° C., employing the above basket type centrifuge until the conductivity of the filtrate reached 5 µS/cm. Thereafter, the resulting cake was placed in "FLASH JET DRYER" (produced by Seishin Enterprise Co., Ltd.) and dried to realize a water content of 1.0 weight %, whereby "Toner Host Particle 1" was prepared.

(External Additive Treatment Process)

To the above-described "Toner Host Particle 1" were added hydrophobic silica (number average primary particle diameter: 12 nm) in an amount of 1 weight % and hydrophobic titanium oxide (number average primary particle diameter: 20 nm) in an amount of 0.3 weight %. Then the mixture was mixed using a HENSCHEL mixer to obtain "Toner 1".

The obtained Toner 1 has a glass transition point of 40° C., and a softening point of 101° C. Here, the glass transition point and the softening point were determined in the methods described above.

<<Preparation of Developer 1>>

The above-describe "Toner 1" was mixed with ferrite carriers of a 60 µm volume average particle diameter, coated with a silicone resin. Thus, "Developer 1" having a toner concentration of 6 weight % was prepared.

<Preparation of Toner 2 for Comparison>

"Toner 2" (for comparison) was prepared in the same manner as preparation of "Toner 1", except that the dispersion of "Resin Particle 1" in Example 1 was changed to the dispersion of "Resin Particle 6" used for preparation of Comparative example 3.

<Preparation of Toner 3 for Comparison>

"Toner 3" (for comparison) was prepared in the same manner as preparation of "Toner 1", except that the dispersion of "Resin Particle 1" in Example 1 was changed to the dispersion of "Resin Particle 20" used for preparation of Comparative example 7.

<<Preparation of Developers 2 and 3>>

Ferrite carriers having a volume average diameter of 35 μm covered with an acrylic resin were mixed with each of the Toners 2 and 3 prepared above, and Developers 2 and 3 each having a toner concentration of 7 weight % were prepared.

<Evaluation of Toner>

A commercially available digital printer "bizhub Pro 1050" (produced by Konica Minolta Business Technologies, Inc.) was used as an image forming apparatus for evaluation.

The above-described image forming apparatus was charged with the Developer prepared as described above. The image formation onto 400,000 sheets of A4-size high quality paper (image support) was carried out at 20° C. under an ambience of a 50% RH. Each print has a character image of a 10% image printing ratio.

<Fog>

Fog density measurement was carried out as follows: initially, the image densities at 20 random points on unprinted white paper were measured and averaged to obtain a white paper density, thereafter, the image densities at 20 random points on the white portions in the print for the evaluation were measured in the same way, and averaged to obtain an average density. A value, obtained by subtracting the white paper density from the latter average density, was evaluated as the fog density. Fog density measurement was carried out using Macbeth Reflective Densitometer "RD-918" In cases where the fog density is 0.003 or less, the print is judged to be passed the fog examination.

<Toner scattering>

By visual observation of the surroundings of the development device of the image forming printer after printing 400,000 sheets, a level of toner scattering and toner spilling were evaluated as below. The levels A, B and C were evaluated to be acceptable as toner scattering in practice.

Criteria of evaluation

Level A: No toner scattering and no toner spilling were observed in the interior of the devices. No stain defect on the print was observed by toner scattering Level B: Toner scattering and toner spilling were slightly observed the interior of the devices. But no stain defect on the print was observed by toner scattering, and the print image was acceptable in practice.

Level C: Staining of the interior of the devices by toner scattering and toner spilling was observed. Slight stain defect on the print caused by toner scattering was partially observed. But, the print image was acceptable in practice.

Level D: Severe staining of the interior of the devices by toner scattering and toner spilling was observed. Stain defect on the print caused by toner scattering was observed. And the print image was unacceptable in practice.

The evaluation results are shown in Table 4

TABLE 4

| Toner No. | Resin Particle No. | Fog | Toner scattering |
|---|---|---|---|
| Toner 1 | Resin Particle 1 | 0.002 | A |
| Toner 2 | Resin Particle 6 | 0.01 | D |
| Toner 3 | Resin Particle 20 | 0.02 | D |

From the evaluation results shown in Table 4, "Toner 1" which was prepared by using Resin Particle 1 in Example 1 of the present invention was evaluated to be passed both Fog and Toner scattering tests. On the other hand, comparative "Toner 2" and "Toner 3" each respectively prepared by using "Resin Particle 6" and "Resin Particle 20" were found to have a problem in the test of Fog and Toner scattering.

What is claimed is:

1. A tubular flow reactor comprising:
   a cylindrical channel;
   a mixing shaft which is concentric with the cylindrical channel; and
   a mixing blade directly attached to the mixing shaft,
   wherein the tubular flow reactor satisfy the following requirements:
   $t < 2C$
   $t/2C < A/C \geq 1$,
   provided that C is a radius of the mixing shaft, t is a thickness of the mixing blade; A is a distance between a mixing blade plane B located at a forward position in a rotating direction of the mixing blade and a plane S passing through the center of the mixing shaft in a shaft direction, when plane B and plane S are parallel; and the mixing blade plane B is located at a more forward position in the rotating direction than the plane S; a center plane L of the mixing blade is located at a more forward position in the rotating direction than the plane S;
   $0.80 \geq Lb/La \geq 0.99$,
   provided that La is a length of the cylindrical channel and Lb is a length of the mixing blade; and
   C/d is in the range of 0.1 to 0.4, provided that d is a diameter of the mixing blade.

2. The tubular flow reactor of claim 1, satisfying the following requirment:
   $1 \geq La/D \geq 100$,
   provided that La is a length of the cylindrical channel and D is an inside diameter of the cylindrical channel.

3. A method for producing a polymer resin particle comprising the step of:
   polymerizing a polymerizable monomer using the tubular flow reactor of claim 1.

4. A method for producing a polymer resin particle comprising the step of:
   polymerizing a polymerizable monomer with an emulsion polymerization method using the tubular flow reactor of claim 1.

5. The tubular flow reactor of claim 1, wherein t/2C is in the range of 0.04 to 0.60.

6. The tubular flow reactor of claim 1, wherein t/2C is in the range of 0.05 to 0.30.

7. The tubular flow reactor of claim 1, wherein A/C is in the range of 0.06 to 1.00.

8. The tubular flow reactor of claim 1, wherein A/C is in the range of 0.50 to 1.00.

9. The tubular flow reactor of claim 1, wherein d/D is in the range of 0.3 to 0.9, provided that d is a diameter of the mixing blade and D an inside diameter of the cylindrical channel.

10. The tubular flow reactor of claim 1,
    wherein d/D is in the range of 0.5 to 0.7, provided that d is a diameter of the mixing blade and D an inside diameter of the cylindrical channel.

11. The tubular flow reactor of claim 1,
    wherein C/d is in the range of 0.2 to 0.3, provided that C is a radius of the mixing shaft and d is a diameter of the mixing blade.

* * * * *